C. D. BLACKMAN.
AUTOMATIC SHUT-OFF COCK.
APPLICATION FILED FEB. 14, 1912.
1,050,423.
Patented Jan. 14, 1913.
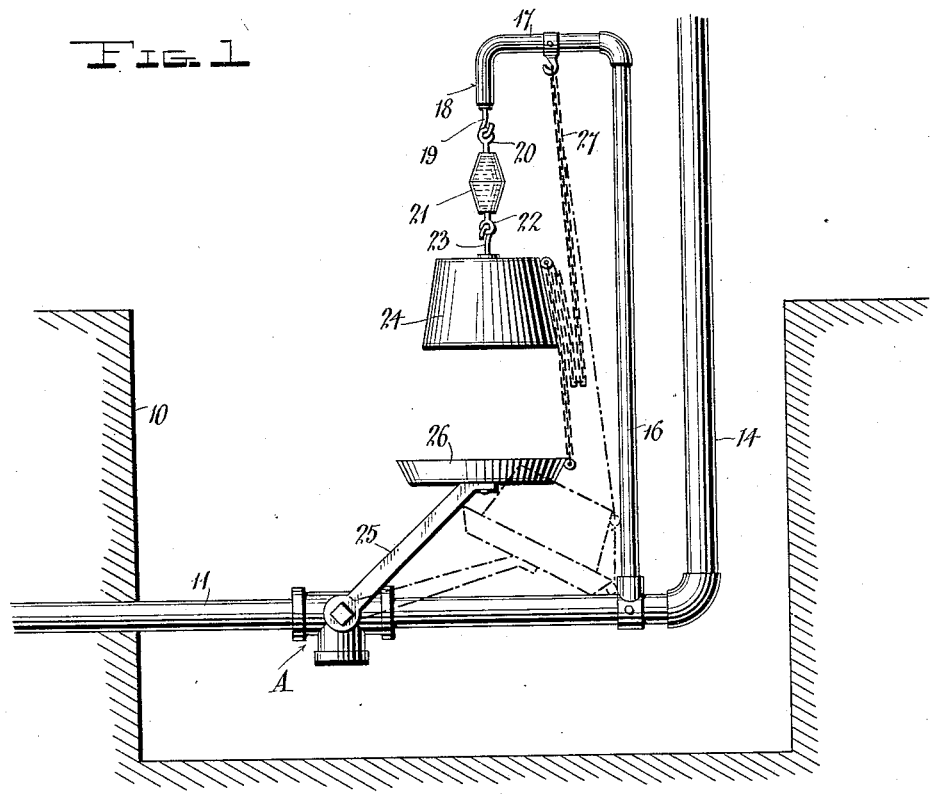
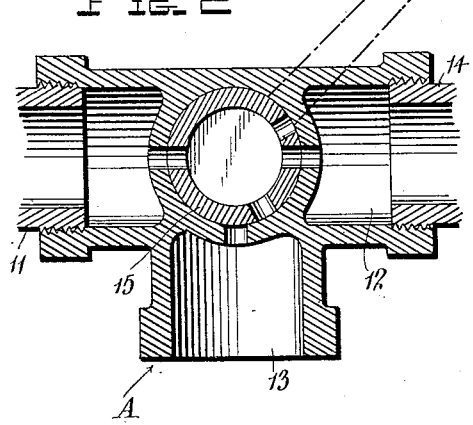
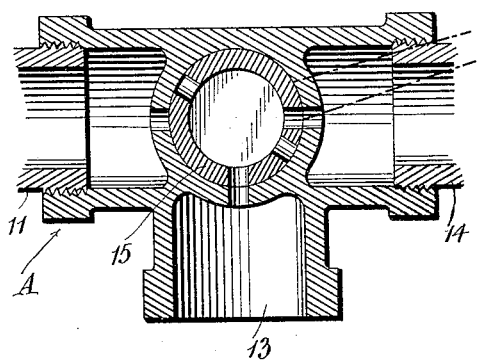
Witnesses
Inventor
C. D. Blackman,
By Harry Ellis Chevalier
Attorney

UNITED STATES PATENT OFFICE.

CHARLES D. BLACKMAN, OF DODGE CITY, KANSAS.

AUTOMATIC SHUT-OFF COCK.

1,050,423.  Specification of Letters Patent.  Patented Jan. 14, 1913.

Application filed February 14, 1912. Serial No. 677,423.

*To all whom it may concern:*

Be it known that I, CHARLES D. BLACKMAN, a citizen of the United States, residing at Dodge City, in the county of Ford and State of Kansas, have invented certain new and useful Improvements in Automatic Shut-Off Cocks, of which the following is a specification.

This invention relates to automatic shut off cocks.

The object of the invention resides in the provision of an automatic shut off cock disposed in the connection between a water main and the piping of a building and which has associated therewith automatic means, operable when the temperature reaches the freezing point, for closing said shut off cock and draining the piping within the building to prevent freezing of the latter.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a view in elevation of a portion of the connections between a water main and the piping of a building showing the invention applied, the parts of the automatic shut off cock being shown in full lines in the position they would occupy when the shut off cock is open, and in dotted lines in the position they would occupy when the shut off cock is closed, Fig. 2, an enlarged longitudinal section through the shut off cock with the parts thereof in open position, and Fig. 3, a view similar to Fig. 2 with the parts of the shut off cock in closed position.

Referring to the drawings, 10 indicates the ground in which is buried a connection 11 leading from a water main (not shown). The delivery end of the connection 11 has attached thereto a valve casing A and this casing is provided with a discharge opening 12 and a drain opening 13. Secured in the discharge opening 12 is the intake end of a building piping 14. Mounted in the casing A is a valve plug 15 constructed in the well known manner whereby said plug in one position will place the intake and discharge openings in the casing A in communication with each other, while the movement of said plug to another position will place the drain opening 13 in communication with the discharge opening 12 and at the same time close communication between the discharge opening 12 and the connection 11. Mounted upon the piping 14 in any suitable manner is a vertical arm 16 having a lateral extension 17 at its upper end directed toward the casing A and terminating in a depending portion 18 which supports a hook 19. This hook 19 engages an eye member 20 suitably anchored in the upper end of a closed glass vial filled with water. Depending from the lower end of this vial 21 is an eye member 22 which is engaged by a hook 23 secured to the upper end of a weight 24 whereby said weight may be supported in an elevated position. The valve plug is adapted to be rotated by an operating lever 25 secured thereto in the usual and well known manner. The free end of this lever 25 carries a pan 26 which is disposed directly beneath the weight 24 when the valve plug 15 is positioned to afford communication between the connection 11 and the piping 14. In this last named position of the valve plug 15 the free end of the lever 25 is also disposed above the plane of the casing A and the connection 11 so that when said weight 24 is released it will drop upon the pan 26 and move the free end of the lever 25 downward which will operate the valve plug 15 so as to close communication between the connection 11 and the piping 14 and open communication between said piping 14 and the drain opening 13. Secured to the extension 17 is the upper end of a chain 27 and the lower end of this chain is secured to the pan 26 while its intermediate portion is connected to the weight 24. The length of chain between its connection with the weight 24 and its connection with the extension 17 is such that when the weight 24 is released it can move downwardly a sufficient distance to operate the valve plug 15 to closed position before the descent of said weight is arrested by the chain 27. Again the length of chain between the pan 26 and its connection with the weight 24 is such that the elevation of the weight 24 will simultaneously operate the valve plug 15 to open position.

Assuming the parts to be in the position shown in Fig. 1 it will be apparent that upon a freezing temperature being reached the water in the vial 21 will freeze and burst said vial thereby releasing the weight 24 which will then descend and engage the pan 26 so that continued descent of the weight will operate the valve plug 15 to closed position and also open communication between the piping 14 and the drain opening 13 whereby the water in the piping throughout the building will be drained and the possibility of freezing and bursting of the pipes within the building obviated.

What is claimed is:

The combination with a water supply pipe, a shut off and drain cock disposed in said pipe, and an operating lever for the latter, of a support, a weight suspended from said support in position to engage the free end of the operating lever during its descent when released, said weight adapted to be severed from the support upon a predetermined reduction of temperature, and a chain having its terminals connected respectively to the support and the free end of the operating lever and its intermediate portion connected to said weight.

In testimony whereof I affix my signature, in the presence of two witnesses.

CHARLES D. BLACKMAN.

Witnesses:
GEO. E. LAUGHEAD,
GEO. B. DUGAN.